United States Patent
Unno et al.

(10) Patent No.: US 10,323,294 B2
(45) Date of Patent: Jun. 18, 2019

(54) AUSTENITIC STAINLESS STEEL FOIL

(71) Applicant: NIPPON STEEL & SUMIKIN MATERIALS CO., LTD., Tokyo (JP)

(72) Inventors: Hiroto Unno, Tokyo (JP); Naoya Sawaki, Tokyo (JP); Naoki Fujimoto, Tokyo (JP); Masahiro Fukuda, Tokyo (JP); Tomohiro Uno, Tokyo (JP); Toru Inaguma, Tokyo (JP)

(73) Assignee: NIPPON STEEL & SUMIKIN MATERIALS CO., LTD., Tokyo (JP)

( * ) Notice: Subject to any disclaimer, the term of this patent is extended or adjusted under 35 U.S.C. 154(b) by 0 days.

(21) Appl. No.: 15/753,307

(22) PCT Filed: Aug. 17, 2016

(86) PCT No.: PCT/JP2016/074027
§ 371 (c)(1),
(2) Date: Feb. 17, 2018

(87) PCT Pub. No.: WO2017/030149
PCT Pub. Date: Feb. 23, 2017

(65) Prior Publication Data
US 2018/0237882 A1    Aug. 23, 2018

(30) Foreign Application Priority Data
Aug. 17, 2015   (JP) .................................. 2015-160687

(51) Int. Cl.
| | |
|---|---|
| *C22C 38/44* | (2006.01) |
| *C22C 38/42* | (2006.01) |
| *C22C 38/04* | (2006.01) |
| *C22C 38/02* | (2006.01) |
| *C22C 38/00* | (2006.01) |

(Continued)

(52) U.S. Cl.
CPC .................. *C21D 9/48* (2013.01); *B21B 1/22* (2013.01); *B21B 1/38* (2013.01); *B21B 1/40* (2013.01); *B32B 15/08* (2013.01); *B32B 15/085* (2013.01); *B32B 15/18* (2013.01); *C21D 1/74* (2013.01); *C21D 8/0205* (2013.01); *C21D 8/0236* (2013.01); *C21D 8/0268* (2013.01); *C21D 8/0273* (2013.01); *C21D 8/0405* (2013.01); *C21D 8/0436* (2013.01); *C21D 8/0468* (2013.01); *C21D 9/46* (2013.01); *C22C 38/00* (2013.01); *C22C 38/001* (2013.01); *C22C 38/002* (2013.01); *C22C 38/02* (2013.01); *C22C 38/04* (2013.01); *C22C 38/40* (2013.01); *C22C 38/42* (2013.01); *C22C 38/44* (2013.01); *C22C 38/58* (2013.01); *H01M 2/02* (2013.01); *H01M 2/0202* (2013.01); *B32B 2457/10* (2013.01); *C21D 2201/05* (2013.01); *C21D 2211/001* (2013.01); *Y10T 428/12569* (2015.01); *Y10T 428/12951* (2015.01); *Y10T 428/12972* (2015.01); *Y10T 428/12993* (2015.01); *Y10T 428/2495* (2015.01); *Y10T 428/24967* (2015.01); *Y10T 428/26* (2015.01); *Y10T 428/264* (2015.01); *Y10T 428/265* (2015.01)

(58) Field of Classification Search
CPC ... B32B 15/08; B32B 15/085; B32B 2457/10; B32B 15/18; C22C 38/001; C22C 38/44; C22C 38/00; C22C 38/42; C22C 38/58; C22C 38/04; C22C 38/02; C22C 38/002; C22C 38/40; C21D 9/46; C21D 2211/001; C21D 9/48; C21D 8/0273; C21D 8/0205; C21D 1/74; C21D 8/0236; C21D 8/0405; C21D 8/0436; C21D 8/0468; C21D 2201/05; H01M 2/02; H01M 2/0202; Y10T 428/26; Y10T 428/265; Y10T 428/264; Y10T 428/2495; Y10T 428/24967; Y10T 428/12993; Y10T 428/12972; Y10T 428/12973; Y10T 428/12951; Y10T 428/12569; B21B 1/22; B21B 1/40; B21B 1/38
See application file for complete search history.

(56) References Cited

U.S. PATENT DOCUMENTS 5,980,662 A * 11/1999 Kim ....................... C21D 6/004
                                                          148/579
6,187,452 B1    2/2001   Muto et al.
(Continued)

FOREIGN PATENT DOCUMENTS

EP    2157195 A1    2/2010
JP    2000-273586 A    10/2000
(Continued)

OTHER PUBLICATIONS

Extended European Search Report, dated Jan. 28, 2019, for corresponding European Application No. 16837138.3.

Primary Examiner — Michael E. La Villa
(74) Attorney, Agent, or Firm — Birch, Stewart, Kolasch & Birch, LLP

(57) ABSTRACT

Provided is an austenitic stainless steel foil that demonstrates a high degree of stretch formability and little deformation anisotropy with respect to stretch forming despite having a sheet thickness of 60 μm or less. The austenitic stainless steel foil of the present invention has a sheet thickness of 5 μm to 60 μm, a recrystallization rate of 90% to 100%, and a texture in which the total of the area ratio of a crystal orientation in which the difference in orientation from the {112}<111> orientation is within 10°, the area ratio of a crystal orientation in which the difference in orientation from the {110}<112> orientation is within 10°, and the area ratio of a crystal orientation in which the difference in orientation from the {110}<001> orientation is within 10°, in a measuring field thereof, is 20% or less.

11 Claims, No Drawings

(51) Int. Cl.

| | |
|---|---|
| *H01M 2/02* | (2006.01) |
| *B32B 15/085* | (2006.01) |
| *C21D 9/48* | (2006.01) |
| *C21D 8/02* | (2006.01) |
| *C21D 1/74* | (2006.01) |
| *B32B 15/08* | (2006.01) |
| *B32B 15/18* | (2006.01) |
| *C21D 9/46* | (2006.01) |
| *C22C 38/58* | (2006.01) |
| *B21B 1/22* | (2006.01) |
| *B21B 1/38* | (2006.01) |
| *B21B 1/40* | (2006.01) |
| *C21D 8/04* | (2006.01) |
| *C22C 38/40* | (2006.01) |

(56) References Cited

U.S. PATENT DOCUMENTS

| | | |
|---|---|---|
| 2009/0029245 A1 | 1/2009 | Ibaragi et al. |
| 2014/0290565 A1 | 10/2014 | Kim et al. |
| 2017/0009312 A1 | 1/2017 | Unno et al. |

FOREIGN PATENT DOCUMENTS

| | | |
|---|---|---|
| JP | 2003-239044 A | 8/2003 |
| JP | 20015-342693 A | 12/2003 |
| JP | 2004-52100 A | 2/2004 |
| JP | 2007-168184 A | 7/2007 |
| JP | 2010-194759 A | 9/2010 |
| JP | 4608256 B2 | 1/2011 |
| JP | 2012-92361 A | 5/2012 |
| JP | 2013-41788 A | 2/2013 |
| WO | WO 2015/122523 A1 | 8/2015 |

\* cited by examiner

AUSTENITIC STAINLESS STEEL FOIL

TECHNICAL FIELD

The present invention relates to an austenitic stainless steel foil. More particularly, the present invention relates to an austenitic stainless steel foil provided with favorable formability despite having an extremely thin sheet thickness.

BACKGROUND ART

Batteries such as lithium ion batteries installed in numerous electronic devices are required to have compact size and light weight in response to the increasingly high levels of portability and mobility of these devices accompanying reductions in size and weight. The reductions in battery size and weight required by electronic devices such as smartphones in particular require leading-edge specifications.

The battery cases of lithium ion batteries currently available for use in smartphones use a can-shaped aluminum thin sheet or aluminum foil laminated with a resin film. Resin film-laminated aluminum foil is frequently used for the purpose of improving capacity density per volume in particular. More recently, even thinner cladding materials are being required for the purpose of further reducing size and weight. However, when the thickness of the aluminum foil serving as the base material is reduced, problems occur such as increased susceptibility to the occurrence of pinholes during the course of production, being unable to ensure moisture impermeability, reductions in puncture strength and rigidity, and being unable to ensure adequate strength with respect to external impacts and internal expansion of the battery. Consequently, aluminum foil is considered to have reached its limit with respect to further reductions in thickness.

Therefore, attention has been focused on the use of foil made of stainless steel (stainless steel foil) since it demonstrates higher rigidity and strength than aluminum. However, since stainless steel has higher specific gravity than aluminum, in order to apply stainless steel to battery cases required for use in increasingly compact and lightweight electronic devices, stainless steel foil is required that has an extremely thin sheet thickness (such as 60 μm or less). In order to increase battery capacity in particular, stainless steel foil is required that it should enable high processability in terms of, for example, demonstrating uniform formability when formed into the shape of a square can despite having a sheet thickness of 60 μm or less.

Stainless steel foil having a thickness of 25 μm or less is disclosed in Patent Document 1 as an example of ultrathin stainless steel foil. When the thickness of stainless steel is made to be extremely thin, voids form accompanying the formation of cracks extending from etched edges in the direction of rolling. The invention disclosed in Patent Document 1 solves this problem by limiting the number of inclusions that measure 5 μm or larger in size.

In addition, examples of applying stainless steel foil to a battery case are disclosed in Patent Documents 2 to 4. Patent Document 2 discloses an example of a battery outer jacket member formed by pressing stainless steel foil having a thickness of 20 μm to 100 μm, Patent Document 3 discloses that an example of a battery jacket material formed by pressing stainless steel foil having a thickness of 100 μm, and Patent Document 4 discloses that an example of a battery jacket material formed by pressing stainless steel foil having a thickness of 40 μm to 150 μm.

PRIOR ART DOCUMENTS

Patent Documents

[Patent Document 1] Japanese Unexamined Patent Publication No. 2000-273586
[Patent Document 2] Japanese Unexamined Patent Publication No. 2004-52100
[Patent Document 3] Japanese Unexamined Patent Publication No. 2013-41788
[Patent Document 4] Japanese Unexamined Patent Publication No. 2012-92361
[Patent Document 5] Japanese Unexamined Patent Publication No. 2007-168184

DISCLOSURE OF THE INVENTION

Problems to be Solved by the Invention

Ultrathin stainless steel foil is usually subjected to punching or etching directly after rolling without being post-annealed or after being subjected to heat treatment for improving tensile strength and proof stress in the manner of tension annealing, in many cases, such as the springs used for the head suspension of hard disk drives (HDD). The art disclosed in Patent Document 1 solves these technical problems that occur during etching.

However, in the case of applying ultrathin stainless steel foil to a battery case, the battery case is formed by press-forming the ultrathin stainless steel foil. Press forming is typically classified into deep drawing and stretch forming. Deep drawing comprises deforming the material by subjecting to tensile deformation in the inflow direction of the material and subjecting to compressive deformation in the widthwise direction perpendicular to the inflow direction as is typically represented by cupping deep drawing. On the other hand, stretch forming comprises forming in which the surface perpendicular to the direction of sheet thickness of the foil (to also be referred to as rolled surface) is subjected to equibiaxial tensile deformation. Since stretch forming is carried out in the case of forming into the shape of a square can in the manner of a battery case, the portions of the stainless steel foil located at the corners in particular are subjected to the greatest amount of tensile deformation. Consequently, if a large number of crystal grains oriented in a direction unfavorable for deformation are present at those portions, problems such as fracturing end up occurring since the stainless steel foil is unable to deform sufficiently even if subjected to press forming. Thus, it is preferable that the stainless steel foil to be subjected to processing in which the rolled surface is stretched in an arbitrary direction has an excellent stretch formability in an arbitrary direction rather than the stretch formability in a specific direction, or in other words, has an excellent stretch formability with little anisotropy.

As a result of conducting extensive studies in view of the aforementioned circumstances, the inventors of the present invention found that, when conventional annealing treatment (such as bright annealing) is carried out on stainless steel foil with taking no account of treatment conditions, the crystal grains of which the stainless steel foil is composed coarsen, and further the orientation of these crystal grains ends up accumulating in specific crystal orientations. As this accumulation of the orientation of crystal grains in specific crystal orientations progresses, deformation anisotropy with respect to stretch forming ends up increasing. Therefore, it was considered that uniform forming of the stainless steel sheet became difficult and forming depth was reduced.

Patent Document 2 describes an example of pressing stainless steel foil having a thickness of 20 μm to 100 μm to form into a battery case. However, Patent Document 2 does not indicate any awareness of the problem concerning accumulation of crystal orientations. Consequently, annealing temperature becomes high, and accumulation of crystal orientations proceeds. Therefore, it is considered that the stainless steel foil of Patent Document 2 exhibits large deformation anisotropy with respect to stretch forming.

Patent Document 3 also describes an application example of stainless steel foil having a thickness of 100 μm to a battery case. However, since stainless steel foil having a thickness of 100 μm is comparatively thick, although it demonstrates a high degree of processability, the effect of increasing battery capacity due to reducing case thickness is small.

Patent Document 4 describes an example of applying stainless steel foil having a thickness of 40 μm to 150 μm to a battery outer jacket member. The technology described in Patent Document 4 is used to reduce the generation of deformation-induced martensite during press forming by nitriding the surface layer of the stainless steel foil. It is explained that, as a result thereof, peeling resistance at those locations where the stainless steel foil and resin are joined by thermal fusion bonding can be ensured and blushing of the resin during press forming can be prevented. Moreover, Patent Document 4 states that press formability is improved since smoothness of the surface is maintained by preventing from surface irregularities formed by deformation-induced martensite transformation.

However, as a result of conducting extensive studies, the inventors of the present invention found that, when the surface layer of stainless steel foil is nitrided the nitrided portions become hardened and susceptible to cause tearing (cracking) during press forming. When the sheet thickness of the stainless steel foil reaches 60 μm or less in particular, the effect of the hardened portions of the nitrided surface layer becomes relatively large and no longer negligible. Namely, when ultrathin stainless steel foil having a nitrided surface layer is subjected to press forming, cracks are formed in the surface, and it is not able to obtain the adequate press formability. Thus, although the thickness of stainless steel foil can be made to be thin, it is considered that forming depth becomes small. Namely, there is little effect of increasing battery capacity.

Furthermore, in Patent Document 4, since nearly all sheet thicknesses in the examples are 100 μm, they cannot be expected to demonstrate the effect of increasing battery capacity by reducing thickness. In addition, Patent Document 4 specifies that although formability of the example in which sheet thickness is 40 μm is poor this is within an acceptable range. Moreover, since there are no examples of thinner sheet thicknesses, the technology described in Patent Document 4 is unable to realize both significantly reducing the thickness of stainless steel foil and increasing forming depth.

With the foregoing in view, an object of the present invention is to provide an ultrathin austenitic stainless steel foil having a sheet thickness of 60 μm or less that exhibits excellent stretch formability with little deformation anisotropy with respect to stretch forming.

Furthermore, although there are no particular lower limit of sheet thickness, since the realistic limit of sheet thickness of foil after undergoing rolling is about 5 μm, the thickness of the austenitic stainless steel foil according to the present invention is 5 μm to 60 μm.

Means for Solving the Problems

The inventors of the present invention obtained the following findings by conducting extensive studies to solve the aforementioned problems.

(a) Deformation anisotropy with respect to stretch forming can be reduced and forming depth can be increased by making the proportion of crystal grains oriented (accumulated) in specific directions in austenitic stainless steel to be within a specific range, or in other words, by making the orientation of the crystal grains to be random while reducing dislocation density in austenitic stainless steel.

(b) In order to allow the orientations of crystal grains to be random while reducing dislocation density, it is necessary to introduce numerous dislocations serving as nucleation sites during recrystallization into the austenitic stainless steel by carrying out rolling under high pressure, and to maintain the recrystallized crystal grains in a fine state while recrystallizing by subsequently carrying out annealing to reduce dislocation density.

(c) Plastic deformability (such as favorable stretch formability) is preferably ensured by keeping the number of crystal grains in the direction of sheet thickness 3 or more. In addition, the lower limit of the number of crystal grains in the direction of sheet thickness may also be determined corresponding to sheet thickness.

(d) It is important to minimize nitriding of the surface layer in order to prevent from tearing (cracking) caused by surface hardening.

(e) Resistance to electrolytic solutions can also be ensured by keeping the number of crystal grains in the direction of sheet thickness 3 or more and making the nitrogen concentration of the surface layer to be 1.0% by mass or less. In other words, in order to improve resistance to electrolytic solutions, it is important to maintain adhesiveness with a resin coating by preventing from roughening of the surface of the stainless steel foil at the corner portions thereof following press forming.

The present invention was completed based on the aforementioned findings and aspects of the present invention are as indicated below.

(1) An austenitic stainless steel foil having a sheet thickness of 5 μm to 60 μm, comprising:
a recrystallization rate of 90% to 100%, and
an texture in which the total of the area ratio of a crystal orientation in which the difference in orientation from the {112}<111> orientation is within 10°, the area ratio of a crystal orientation in which the difference in orientation from the {110}<112> orientation is within 10°, and the area ratio of a crystal orientation in which the difference in orientation from the {110}<001> orientation is within 10°, in a measuring field of the stainless steel foil, is 20% or less.

(2) The austenitic stainless steel foil described in (1), wherein the sheet thickness is 5 μm to 25 μm.

(3) The austenitic stainless steel foil described in (1) or (2), wherein the number of crystal grains in the direction of sheet thickness is 3 or more.

(4) The austenitic stainless steel foil described in any of (1) to (3), wherein the nitrogen concentration of the surface layer is 1.0% by mass or less.

(5) The austenitic stainless steel foil described in any of (1) to (4), wherein a resin film is laminated on at least one surface of the austenitic stainless steel foil.

Effects of the Invention

According to the present invention, an austenitic stainless steel foil can be provided that demonstrates an excellent stretch formability and little deformation anisotropy with respect to stretch forming despite having a sheet thickness of 60 μm or less. The austenitic stainless steel foil according to the present invention is preferable for a battery case of a lithium ion battery and the like, which is directed to reduction in size and weight.

BEST MODE FOR CARRYING OUT THE INVENTION

The following provides a detailed explanation of the present invention.
(1. Austenitic Stainless Steel Foil)
[Stainless Steel Material]
Although there are no particular limitations on the austenitic stainless steel foil according to the present invention provided it is composed of austenitic stainless steel, the austenitic stainless steel preferably has the composition range indicated below. This composition range comprises, by mass percent, C at 0.080% or less, Si at 2.0% or less, Mn at 2.0% or less, P at 0.045% or less, S at 0.030% or less, Ni at 5.0% to 11.0%, Cr at 15.0% to 20.0%, Mo at 0.30% or less, N at 0.05% or less and Cu at 0.50% to 2.50%, with the balance consisting of Fe and unavoidable impurities. Commercially available austenitic stainless steel may also be used for the aforementioned austenitic stainless steel.

[Sheet Thickness: 5 μm to 60 μm]
The sheet thickness of the austenitic stainless steel foil according to the present invention is 5 μm to 60 μm. Sheet thickness is defined to be 60 μm or less in order to maximize the effect of increasing battery capacity in the case of applying the stainless steel foil to a battery case. Sheet thickness is preferably 50 μm or less, more preferably 40 μm or less and even more preferably 25 μm or less. In addition, although there are no particular limitations on the lower limit of sheet thickness, in consideration of limitations on production technology, a sheet thickness of 5 μm may be set for the lower limit. The effects of the present invention can still be enjoyed even in the case of a sheet thickness of 5 μm.

[Recrystallization Rate (Ratio): 90% to 100%]
The austenitic stainless steel foil according to the present invention is required to have favorable stretch formability (plastic deformability). The dislocations and other lattice defects accumulate in the microstructure of the austenitic stainless steel by rolling the austenitic stainless steel. Therefore, crystal grains have high dislocation density and are hardened despite being fine. Consequently, it is necessary to recrystallize the structure and reduce dislocation density by properly controlling heat treatment conditions corresponding to the material. Namely, since the formation of recrystallized structure is driven by dislocation density, favorable stretch formability (plastic deformability) is ensured by preventing from the recrystallized structure from coarsening while reducing dislocation density within recrystallized grains.

Furthermore, although the etch-pit method is an example of a method used to measure dislocation density, the quantitative measurement which is carried out by this method is difficult since it is affected by measurement conditions and other factors. Although dislocation density can be measured directly by microscopic observation, variations are considerable due to differences between fields of observation. Therefore, the inventors of the present invention found that, by measuring recrystallization rate as a characteristic value reflecting dislocation density, it is possible to determine whether or not proper heat treatment has been carried out.

Recrystallization rate is calculated by dividing the area of recrystallized crystal by the observation area. The area of recrystallized crystal can be obtained by observing an arbitrary cross-section of the austenitic stainless steel foil using an optical microscope. Alternatively, it may also be calculated by determining the half peak width of the diffraction peak of the (220) plane obtained by X-ray analysis of the stainless steel foil. A half peak width maximum of 0.20 degrees or less can be considered to correspond to a recrystallization rate of 90% or more, that of 0.15 degrees or less can be considered to correspond to a recrystallization rate of 95% or more, and that of 0.10 degrees or less can be considered to correspond to a recrystallization rate of 100%.

The recrystallization rate of the austenitic stainless steel foil according to the present invention is 90% or more. If the recrystallization rate is 90% or more, dislocation density is sufficiently low and formability can be ensured. Recrystallization rate is preferably 95% or more. Recrystallization rate may be 100% if the texture to be subsequently described satisfies the requirements of the present invention. Namely, the entire austenitic stainless steel foil according to the present invention may be recrystallized.

(Texture)
The austenitic stainless steel foil according to the present invention has a characteristic texture as a result of further controlling the recrystallization process while maintaining recrystallization rate within the aforementioned ranges. More specifically, the austenitic stainless steel foil according to the present invention has a texture in which the total of the area ratio of a crystal orientation in which the difference in orientation from the {112}<111> orientation is within 10°, the area ratio of a crystal orientation in which the difference in orientation from the 11101<112> orientation is within 10°, and the area ratio of a crystal orientation in which the difference in orientation from the {110}<001> orientation is within 10°, in a measuring field thereof, is 20% or less. Furthermore, in the aforementioned orientations, the {112}, {110} and {110} planes indicate planes parallel to the rolled surface, while the <111>, <112> and <001> orientations indicate directions parallel to the direction of rolling. Moreover, the aforementioned three orientations are composed as a group of orientations that includes crystallographically equivalent orientations.

The aforementioned {112}<111> orientation is an orientation that is referred to as "Copper orientation", the aforementioned {110}<112> orientation is referred to as "Brass orientation", and the aforementioned {110}<001> orientation is referred to as "Goss orientation". These three orientations are superior in terms of energy and are known to be accumulated (oriented) preferentially in the recrystallization texture of austenitic stainless steel.

In rolled austenitic stainless steel foil, the proportion of crystal grains oriented such that the difference in orientation from these three orientations is within 10° is low, and even though the orientations of crystal grains in the texture are comparatively random, formability is inferior due to high dislocation density as previously described. Therefore, dislocation density is lowered by promoting textural recovery and recrystallization through annealing treatment. At this time, the crystal grains coarsen (undergoing crystal growth)

through recrystallization. In addition, since the aforementioned three orientations are superior in terms of energy, the proportion of crystal grains accumulating in these three orientations increases.

As crystal grain orientation proceeds in these specific orientations, the crystal grains are disproportionately arranged in a row in a specific orientation. In this case, when the stainless steel foil is subjected to stretch forming or other press forming, although favorable formability is demonstrated in those orientations favorable for deformation (orientations in which slipping occurs easily), formability becomes poor in those orientations unfavorable for deformation (orientations in which slipping occurs with difficulty). When the foil is subjected to stretch forming so as to be stretched in an arbitrary direction of the rolled surface such as the corners of a battery case, while some orientations show adequate elongation (deformation), other orientations unfavorable for deformation (poor plastic deformability) may initiate fracturing and the like. Thus, a desired forming depth may not be obtained. In other words, deformation anisotropy occurs with respect to stretch forming.

Therefore, in order to reduce the anisotropy of formability caused by the degree of orientation of the crystal grains, the present invention randomizes the orientations of crystal grains in the texture which has been recrystallized by carrying out annealing treatment. As was previously described, since the crystal grains of austenitic stainless steel easily accumulate in three orientations consisting of the {112}<111> orientation, {110}<112> orientation and {110}<001> orientation, the total proportion of the area occupied by crystal grains considered to be oriented in each direction (crystal grains oriented such that the difference in orientation from each orientation is within 10°) is 20% or less. As a result, by eliminating bias in the orientation of crystal grains in the texture of austenitic stainless steel foil and reducing anisotropy of formability, adequate forming depth can be obtained even in cases of being subjected to processing that causes the rolled surface to be stretched in any arbitrary direction. Furthermore, crystal orientations of the region which do not accumulate such that the difference in orientation from the aforementioned three orientations is within 10° are crystal orientations which are less easily accumulated than the aforementioned three orientations, and crystal orientations of the region are not accumulated in specific orientations. In other words, in the case of an arbitrary crystal orientation X in which the difference in orientation from the aforementioned three orientations exceeds 10°, the area ratio of crystal orientations in which the difference in orientation from X is within 10° is 20% or less.

In the present invention, the total of the area ratio occupied by a crystal orientation in which the difference in orientation from the {112}<111> orientation is within 10°, a crystal orientation in which the difference in orientation from the {110}<112> orientation is within 10°, and a crystal orientation in which the difference in orientation from the {110}<001> orientation is within 10° in a measuring field is preferably 15% or less and more preferably 7% or less.

In the present invention, the area ratio occupied by crystal orientations in which the difference in orientation from each of the aforementioned orientations is within 10° can be calculated by determining the crystal orientation at each measurement point using electron backscatter diffraction (EBSD). The method of measurement using EBSD measures crystal orientation by connecting an EBSD detector to a scanning electron microscope (SEM), inclining the sample at an angle of about 70°, and analyzing the diffraction pattern (EBSD pattern) when a prescribed measuring field on the inclined sample surface is irradiated with a convergent electron beam.

More specifically, several orientations are estimated from the diffraction pattern at each measurement point, and the orientation having the highest degree of certainty is determined to be the crystal orientation at that measurement point. The orientations at each of the measurement points determined in this manner are then color-coded and plotted corresponding to a location in an inverse pole figure to obtain an inverse pole figure (IPF) map. On the basis of this IPF map, the proportion of the area of measuring fields occupied by crystal grains in which the difference in orientation with each of the aforementioned orientations is equal to or less than a tolerance angle (10° in the present invention) is calculated as the form of an area ratio. Furthermore, in the present invention, the measuring field is preferably a region which is about 100 μm×100 μm or larger.

[Three or More Crystal Grains in Direction of Sheet Thickness]

There are preferably three or more crystal grains in the direction of sheet thickness in the austenitic stainless steel foil according to the present invention. The number of crystal grains in the direction of sheet thickness can be determined by measuring crystal grain size in compliance with JIS G 0551, calculating average crystal grain size, dividing sheet thickness by average crystal grain size, and using the quotient thereof as the number of crystal grains in the direction of sheet thickness. Furthermore, in the case the crystal grains are equiaxed grains, average crystal grain size may be calculated by measuring crystal grain size in the plane perpendicular to the direction of sheet thickness.

Alternatively, three or more arbitrary lines are drawn in the direction of sheet thickness in an arbitrary cross-section, and the number of crystal grains traversed by these lines is counted followed by determining the average value thereof to obtain the number of crystal grains in the direction of sheet thickness. At that time, crystal grains are counted as 0.5 grains in the case they are contacting the surface. In addition, in the case a line runs along a crystal grain boundary, each of the plurality of crystals that compose the crystal gain boundary can also be counted. However, since both edges of the stainless steel foil in the widthwise direction are easily affected by annealing, they are not suitable for measurement of the number of crystal grains. Consequently, the number of crystal grains is preferably measured by drawing arbitrary lines in the direction of sheet thickness while excluding both edges of the stainless steel foil in the widthwise direction. For example, the number of crystal grains in the direction of sheet thickness of the stainless steel foil can be evaluated by counting the number of crystal grains at three locations consisting of the center in the widthwise direction of the stainless steel foil (location located at ½ the width from one edge) and locations intermediate between both edges and the center (two locations located at ¼ the width and ¾ the width from one edge), and then calculating the average value thereof.

If the number of crystal grains determined in this manner is 3 or more, plastic deformability improves and stretch formability is favorable. Therefore, this manner is the preferable determination. Namely, in order for individual crystal grains to undergo plastic deformation to an arbitrary shape, it is necessary that von Mises conditions are satisfied and that more than one slip system causes multiple slip. However, if there are too few crystal grains in the direction of sheet thickness, the probability of crystal grains in an orientation that does not satisfy von Mises conditions with respect to the direction of deformation (crystal grains having inferior deformability) arranging in the direction of thickness is likely to increases. This being the case, since these crystal grains are unable to accommodate overall deformation of the foil during press forming, they end up becoming the origins of fractures. On the other hand, if three or more crystal grains are present in the direction of sheet thickness, even if crystal grains having inferior deformability are present, since the surrounding crystal grains thereof are capable of being deformed into an arbitrary shape and maintaining deformation of the foil overall, the result is improvement of plastic deformability.

Moreover, determination of the number of crystal grains in the direction of sheet thickness depending on sheet thickness makes it possible to more reliably ensure plastic deformability. Therefore, this determination is the preferable manner. Since deformation resistance increases as sheet thickness becomes thicker, the number of crystal grains should be increased as sheet thickness becomes thicker. More specifically, in the case of sheet thickness of 15 µm or more, the number of crystal grains in the direction of sheet thickness is preferably 5 or more, and in the case of sheet thickness of 40 µm or more, the number of crystal grains is preferably 10 or more. This makes it possible to further improve plastic deformability. Furthermore, the effect of sheet thickness on the number of crystal grains in the direction of sheet thickness is of a negligible degree in the case of austenitic stainless steel foil having a sheet thickness of less than 15 µm.

There are no particular limitations on the upper limit of the number of crystal grains. This is because the number of crystal grains in the direction of sheet thickness varies according to the sheet thickness of the austenitic stainless steel foil. There are no particular limitations on crystal grain size (crystal grain size as determined in compliance with JIS G 0051 (to be referred to as "crystal grain size" in the present description unless specifically indicated otherwise)) provided the number of crystal grains is three or more. This is because the aforementioned multiple slip is determined not by the size of crystal grains, but by the number of crystal grains in the direction of sheet thickness.

[Surface Layer Nitrogen Concentration]

As was previously described, in the case of nitriding the surface layer of stainless steel foil, specifically when reducing the thickness of the stainless steel foil, various problems appear due to hardening of the surface layer caused by nitriding. Thus, the surface layer of stainless steel foil is preferably not nitrided. The feature wherein "a surface layer is not nitrided" means that the nitrogen concentration of the surface layer is 1.0% or less by mass. Here, the surface layer refers to the thickness at which nitrogen concentration is half the peak value as determined by measuring according to Auger electron spectroscopy, and nitrogen concentration refers to the average concentration thereof in the surface layer.

Although repeating the previous explanation, in the case the surface layer of stainless steel foil has been nitrided, since the surface layer becomes hard due to this nitriding and the location of that nitriding serves as an origin of tearing during press forming, press formability ends up decreasing. In the case of the thin stainless steel foil according to the present invention having a sheet thickness of 60 µm or less, the effects of the surface become relatively large, and this problem becomes apparent. Since making nitrogen concentration to be within the aforementioned range enables deformation without causing tearing (cracking) of the surface layer, favorable press formability is obtained. Consequently, it is preferable to make the nitrogen concentration of the surface layer to be 1.0% or less by mass as previously described without increasing the nitrogen concentration in the surface layer of the stainless steel foil. It is not particularly necessary to define a lower limit for nitrogen concentration of the surface layer. The lower limit is equal to the nitrogen content evaluated for the entire stainless steel foil. Namely, in the case of steel of a type that does not contain nitrogen such as ordinary SUS304, the content of nitrogen present in the form of an unavoidable impurity is the lower limit of nitrogen concentration.

The nitrogen concentration of the surface layer of stainless steel foil can be controlled to 1% or less by mass by making the nitrogen concentration in the annealing atmosphere to be 0.1% or less by mass.

[Lamination]

The austenitic stainless steel foil according to the present invention may be laminated austenitic stainless steel foil obtained by laminating a resin film on the surface thereof in the same manner as ordinary laminated stainless steel foil. Lamination of a resin film makes it possible to improve corrosion resistance in electrolyte and further enhance applicability to a battery case such as that of a lithium ion battery.

The resin film may be laminated on both sides of the stainless steel foil or on one side only.

The required level of performance in terms of peeling strength between the stainless steel foil and resin is obtained by providing a chromate-treated layer of a suitable thickness on the surface of the stainless steel foil. For example, Patent Document 5 discloses a technology for providing a chromate-treated layer having a thickness of 2 nm to 200 nm on at least one side of stainless steel foil and laminating a polyolefin-based resin containing a polar functional group on the surface thereof.

In addition, blushing of the resin following press forming can be prevented by optimizing the resin design. More specifically, the resin should be made to be amorphous after heat lamination, and the cooling rate during heat lamination should be increased in order to accomplish this. For example, the cooling rate over the range of 120° C. to 80° C. may be 20° C./s.

(2. Method for Producing Austenitic Stainless Steel Foil)

The following provides an explanation of a method for production of the austenitic stainless steel foil according to the present invention.

The production process of the austenitic stainless steel foil according to the present invention is roughly the same as the production process of ordinary stainless steel foil. Namely, stainless steel strips are rolled into foil followed by cleaning the surface, carrying out final annealing and carrying out temper rolling (using a tension leveler) as necessary to produce stainless steel foil. Furthermore, the foil rolling step may be divided into multiple stages corresponding to the sheet thickness of the stainless steel strips to be subjected to foil rolling (multistage rolling), and intermediate annealing may be carried out between each of the foil rolling stages. However, in order to obtain the austenitic stainless steel foil according to the present invention, it is important to control the rolling reduction rate during final foil rolling and the temperature during final annealing as previously described.

[Rolling Reduction Rate]

Dislocations serving as nucleation sites of recrystallization can be introduced into stainless steel by carrying out high-pressure rolling during foil rolling. The number of dislocations introduced increases as the rolling reduction rate becomes higher. Dislocation density is controlled by the combination of rolling reduction rate and annealing treatment after having carried out rolling. Thus, in the case of having carried out rolling two times or more, the final round of foil rolling, namely the foil rolling carried out immediately before final annealing, is preferably carried out under high-pressure.

More specifically, the rolling reduction rate during foil rolling prior to final annealing is 30% or more. From the viewpoint of ensuring dislocation density, rolling reduction rate is preferably 40% or more and more preferably 45% or more.

Furthermore, rolling reduction rate is defined by the equation indicated below.

Rolling reduction rate=(sheet thickness before rolling−sheet thickness after rolling)/(sheet thickness before rolling)

Since the objectives of foil rolling include introducing dislocations in addition to obviously reducing sheet thickness, there are no particular limitations on the upper limit of rolling reduction rate. However, since a rolling reduction rate of 100% is theoretically not possible, the realistic upper limit of rolling reduction rate is about 95%.

Although depending on the final sheet thickness of the austenitic stainless steel foil, the lower limit of rolling reduction rate is preferably 40% or more if possible and even more preferably 45% or more.

In the case of dividing foil rolling into multiple stages, it is preferable to control the structure of the material during intermediate foil rolling and subsequent intermediate annealing. In this case as well, foil rolling is carried out in the same manner as final foil rolling. Namely, the rolling reduction rate in each stage of foil rolling is 30% or more. However, since foil rolling immediately before final annealing is the most important as previously described, the rolling reduction rate during final foil rolling is preferably set higher than the rolling reduction rate during other stages of foil rolling.

[Annealing Temperature]

Annealing carried out after foil rolling (final annealing) fulfills the important roles of reducing dislocation density and promoting recrystallization. As was previously described, an object of the austenitic stainless steel foil according to the present invention is to reduce dislocation density and promote recrystallization to proceed while preventing from grain growth to prevent from accumulation in specific orientations.

Annealing temperature in the case of the austenitic stainless steel foil according to the present invention is 950° C. to 1050° C. When the annealing temperature is lower than 950° C., it is difficult to reduce dislocation density, and recrystallization rate ends up being low. On the other hand, if the annealing temperature exceeds 1050° C., in addition to crystals becoming excessively large, orientation proceeds in any of the aforementioned three orientations, and favorable formability cannot be obtained. The lower limit of the annealing temperature is a temperature slightly higher than 950° C., is preferably 960° C. and is more preferably 970° C.

From the viewpoint of preventing from accumulation in specific crystal orientations, the upper limit of the annealing temperature is slightly lower than 1050° C., preferably 1040° C. and more preferably 1030° C.

[Annealing Retention Time]

The amount of time to retain the stainless steel foil at the aforementioned annealing temperature is 3 seconds to 30 seconds. If the retention time is less than 3 seconds, heat treatment is inadequate, recrystallization does not proceed sufficiently, and the recrystallization rate defined in the present invention cannot be obtained. On the other hand, if the retention time exceeds 30 seconds, in addition to the recrystallized grains becoming excessively large, orientation proceeds in any of the aforementioned three orientations, and favorable formability cannot be obtained.

[Annealing Atmosphere]

The annealing atmosphere consists of a hydrogen, argon or other rare gas atmosphere so as to prevent nitriding of the surface of the stainless steel foil. Furthermore, although it is desirable that the annealing atmosphere be completely free of nitrogen, nitrogen for which entry from the air is unavoidable is permitted to a certain degree. The nitrogen concentration of the annealing atmosphere should be 0.1% or less by mass in order to make the nitrogen concentration of the surface layer to be 1.0% or less by mass.

[Intermediate Annealing]

In the case of employing multiple foil rolling stages, the temperature during intermediate annealing is preferably 950° C. to 1050° C. although there are no particular limitations on the conditions thereof. Since it is desirable that crystal grain boundaries serve as nuclei of recrystallization and a large number of recrystallized grains are introduced before foil rolling, it is preferable to prevent the recrystallized crystal grains from coarsening by making the intermediate annealing temperature to be within the aforementioned temperature range.

Examples

Austenitic stainless steel foils having the thicknesses indicated in Table 1 were produced as examples of the austenitic stainless steel foil according to the present invention by rolling commercially available SUS304 steel with a foil rolling mill under the rolling conditions indicated in Table 1.

Here, rolling reduction rate indicates the rolling reduction rate in the cold foil rolling step immediately before final annealing, finish annealing temperature indicates the temperature in the final annealing step carried out after finishing the rolling process, and retention time indicates the amount of time the stainless steel foil is retained at the finish annealing temperature.

The annealing atmosphere consisted of a mixed gas comprising nitrogen at 0.1% by volume and hydrogen at 99.9% by volume.

Recrystallization rate was obtained by mirror-polishing a cross-section in the direction of rolling which was to be used as the observed surface, etching and then observing the cross-section, and determining the area of crystal grains that recrystallized over a range defined by total sheet thickness× 500 μm wide and calculating the result of the equation: (area of recrystallized crystals)/(observed area).

The texture of the stainless steel foil following finish annealing was measured by EBSD after polishing the surface of the foil by chemical etching or cross-section polishing (CP). The degrees of accumulation (area %) of crystal orientations in which the differences in orientation from the copper orientation $\{112\}<111>$, brass orientation $\{110\}<112>$ and Goss orientation $\{110\}<001>$ were within 10° were measured in a measuring field measuring 100 μm on a side.

Nitrogen concentration of the surface layer was measured by Auger electron spectroscopy (AES). Measurements were made to a depth of 30 nm from the surface of the stainless steel foil and the average nitrogen concentration to the depth at which oxygen concentration is equal to half of the peak value was taken to be the nitrogen concentration of the surface layer.

The number of crystal grains in the direction of sheet thickness was determined by cutting out a test piece in the direction of sheet thickness, carrying out etching after polishing the cross-section, and observing with an optical microscope, followed by measuring crystal grain size in compliance with JIS G 0551, calculating the average crystal grain size, and taking the quotient obtained by dividing sheet thickness by average crystal grain size to be the number of crystal grains in the direction of sheet thickness.

In addition, a chromate-treated layer having a thickness of 10 nm was provided on one side of the stainless steel foils which were subjected to finish annealing (final annealing), and a polypropylene film was laminated thereon, and then a polyester film or nylon film was laminated on the other side of the stainless steel foils to prepare samples of which sizes were roughly 100 mm square. Press forming was carried out in the center of these samples with a punch of 40 mm high×30 mm wide under conditions of a clearance of 0.3 mm followed by evaluating the maximum depth at which there was no formation of wrinkles or cracks. Since maximum forming depth increases as sheet thickness becomes larger, a forming depth of 4.0 mm or more was evaluated as being favorable in the case of a sheet thickness of 30 μm or less, while a forming depth of 4.5 mm or more was evaluated as being favorable in the case of a sheet thickness of 30 μm or more. The evaluation results are shown in Table 1.

In Comparative Example 1 having a sheet thickness of less than 30 μm, recrystallization did not proceed adequate and recrystallization rate was low due to the low finish annealing temperature. As a result, forming depth was less than 4.0 mm.

On the other hand, in Comparative Examples 2 and 3 having a sheet thickness of less than 30 μm, recrystallization proceeded adequately due to the high finish annealing temperature and the orientations of the recrystallized crystal grains accumulated in each orientation while undergoing further crystal growth. As a result, deformation anisotropy occurred with respect to stretch forming and forming depth was less than 4.0 mm.

In Comparative Examples 4 and 6 having a sheet thickness of 30 μm or more, recrystallization did not proceed adequately and recrystallization rate was low due to the low finish annealing temperature. As a result, forming depth was less than 4.5 mm.

In addition, in Comparative Example 5 having a sheet thickness of 30 μm or more, recrystallization proceeded adequately due to the high finish annealing temperature and the orientations of the recrystallized crystal grains accumulated in each orientation while undergoing further crystal growth. As a result, deformation anisotropy occurred with respect to stretch forming and forming depth was less than 4.5 mm.

According to the above results, by comparing Example 4 with Comparative Example 2 having the same sheet thickness, a difference of 0.3 mm or more was able to be confirmed with respect to forming depth. This difference is extremely significant as indicated below. Namely, in the case

TABLE 1

| New Test No. | Sheet thickness | Rolling Reduction Rate (%) | Finish annealing Temp. (° C.) | Finish annealing Retention Time (sec) | Recrystallization Rate (%) | Degree of Accumulation (A1) Copper orientation (area %) | (A2) Brass orientation (area %) | (A3) Goss orientation (area %) | A1 + A2 + A3 (area %) | No. of Crystal Grains in Direction of Sheet Thickness (no.) | Surface Layer Nitrogen Concentration (wt %) | Molded Depth (mm) |
|---|---|---|---|---|---|---|---|---|---|---|---|---|
| Example 1 | 25 | 60 | 950 | 3 | 90 | 1.0 | 1.5 | 1.9 | 4.4 | 10.0 | 0.8 | 5.0 |
| Example 2 | 25 | 60 | 1000 | 5 | 100 | 2.3 | 2.1 | 1.1 | 5.5 | 7.3 | 0.6 | 4.7 |
| Example 3 | 25 | 60 | 1050 | 5 | 100 | 4.1 | 5.0 | 4.9 | 14.0 | 4.2 | 0.7 | 4.3 |
| Example 4 | 25 | 60 | 1050 | 30 | 100 | 4.9 | 7.3 | 7.8 | 20.0 | 3.0 | 0.8 | 4.2 |
| Example 5 | 5 | 50 | 1000 | 3 | 100 | 1.0 | 2.0 | 7.0 | 10.0 | 3.0 | 0.5 | 4.2 |
| Example 6 | 10 | 50 | 1000 | 5 | 100 | 3.0 | 2.7 | 4.1 | 9.8 | 4.0 | 0.7 | 4.3 |
| Example 7 | 15 | 50 | 970 | 10 | 100 | 2.0 | 2.4 | 3.6 | 8.0 | 5.0 | 0.6 | 4.3 |
| Example 8 | 20 | 64 | 1000 | 15 | 100 | 5.4 | 6.3 | 5.7 | 17.4 | 6.4 | 0.7 | 4.2 |
| Example 9 | 30 | 70 | 1030 | 10 | 100 | 5.4 | 6.2 | 7.9 | 19.5 | 7.2 | 0.5 | 4.5 |
| Example 10 | 40 | 50 | 1000 | 5 | 100 | 5.0 | 3.7 | 8.6 | 17.3 | 11.0 | 0.8 | 4.9 |
| Example 11 | 60 | 50 | 1050 | 10 | 100 | 6.4 | 5.9 | 7.5 | 19.8 | 10.0 | 0.5 | 5.0 |
| Comp. Ex. 1 | 25 | 60 | 900 | 5 | 50 | 1.1 | 1.2 | 2.5 | 4.8 | 15.0 | 0.5 | 3.6 |
| Comp. Ex. 2 | 25 | 60 | 1100 | 5 | 100 | 5.5 | 7.8 | 9.2 | 22.5 | 1.2 | 0.6 | 3.9 |
| Comp. Ex. 3 | 15 | 20 | 1100 | 5 | 100 | 6.5 | 5.0 | 9.2 | 20.7 | 0.8 | 0.6 | 3.0 |
| Comp. Ex. 4 | 30 | 70 | 600 | 5 | 0 | 1.5 | 1.4 | 2.0 | 4.9 | 9.6 | 0.6 | 4.1 |
| Comp. Ex. 5 | 40 | 60 | 1100 | 10 | 100 | 6.8 | 6.9 | 8.5 | 22.2 | 1.8 | 0.4 | 4.3 |
| Comp. Ex. 6 | 60 | 20 | 800 | 10 | 20 | 3.5 | 3.8 | 6.0 | 13.3 | 8.0 | 0.5 | 4.3 |

As shown in Table 1, in the examples of the austenitic stainless steel foil according to the present invention, the proportions of the area occupied by crystal grains accumulated in each orientation were low, and as a result thereof, forming depth was 4.0 mm or more in the case of a sheet thickness of less than 30 μm, while forming depth was 4.5 mm or more in the case of a sheet thickness of 30 μm or more.

of applying stainless steel foil to a battery case installed in a compact and lightweight electronic device such as a smartphone, the battery case is required to have a thickness of about several mm. Under such circumstances, if forming depth is large at 0.3 mm or more, this is equivalent to 10% or more of the thickness of the battery case, which greatly contributes to increased battery capacity. Thus, the effects of the present invention are extremely great.

INDUSTRIAL APPLICABILITY

The austenitic stainless steel foil according to the present invention can be used in a battery case and the like of a lithium ion battery, for example, for use in compact electronic devices.

The invention claimed is:

1. An austenitic stainless steel foil having a sheet thickness of 5 μm to 60 μm, comprising:
   a recrystallization rate of 90% to 100%, and
   an texture in which a total of an area ratio of a crystal orientation in which a difference in orientation from a {112}<111> orientation is within 10°, an area ratio of a crystal orientation in which a difference in orientation from a {110}<112> orientation is within 10°, and an area ratio of a crystal orientation in which a difference in orientation from a {110}<001> orientation is within 10°, in a measuring field of the stainless steel foil, is 20% or less.

2. The austenitic stainless steel foil according to claim 1, wherein a resin film is laminated on at least one surface of the austenitic stainless steel foil.

3. The austenitic stainless steel foil according to claim 1, wherein the sheet thickness is 5 μm to 25 μm.

4. The austenitic stainless steel foil according to claim 3, wherein the number of crystal grains in the direction of sheet thickness is 3 or more, and
   wherein the number of crystal grains in a direction of sheet thickness is determined by measuring crystal grain size in compliance with JIS G 0551, calculating average crystal grain size, dividing sheet thickness by average crystal grain size, and using the quotient thereof as the number of crystal grains in the direction of sheet thickness.

5. The austenitic stainless steel foil according to claim 3, wherein a nitrogen concentration of a surface layer of the stainless steel foil is 1.0% by mass or less.

6. The austenitic stainless steel foil according to claim 3, wherein a resin film is laminated on at least one surface of the austenitic stainless steel foil.

7. The austenitic stainless steel foil according to claim 1, wherein the number of crystal grains in the direction of sheet thickness is 3 or more, and
   wherein the number of crystal grains in a direction of sheet thickness is determined by measuring crystal grain size in compliance with JIS G 0551, calculating average crystal grain size, dividing sheet thickness by average crystal grain size, and using the quotient thereof as the number of crystal grains in the direction of sheet thickness.

8. The austenitic stainless steel foil according to claim 7, wherein a nitrogen concentration of a surface layer of the stainless steel foil is 1.0% by mass or less.

9. The austenitic stainless steel foil according to claim 7, wherein a resin film is laminated on at least one surface of the austenitic stainless steel foil.

10. The austenitic stainless steel foil according to claim 1, wherein a nitrogen concentration of a surface layer of the stainless steel foil is 1.0% by mass or less.

11. The austenitic stainless steel foil according to claim 10, wherein a resin film is laminated on at least one surface of the austenitic stainless steel foil.

* * * * *